(12) United States Patent
Redi et al.

(10) Patent No.: US 10,924,632 B2
(45) Date of Patent: Feb. 16, 2021

(54) APPARATUS AND METHODS FOR DETERMINING AND PROVIDING ANONYMIZED CONTENT WITHIN IMAGES

(71) Applicant: Nokia Technologies Oy, Espoo (FI)

(72) Inventors: Miriam Redi, London (GB); Daniele Quercia, London (GB); Luca Maria Aiello, London (GB)

(73) Assignee: Nokia Technologies Oy, Espoo (FI)

( * ) Notice: Subject to any disclaimer, the term of this patent is extended or adjusted under 35 U.S.C. 154(b) by 54 days.

(21) Appl. No.: 16/160,772

(22) Filed: Oct. 15, 2018

(65) Prior Publication Data

US 2019/0116290 A1    Apr. 18, 2019

(30) Foreign Application Priority Data

Oct. 16, 2017  (EP) .................................. 17196507

(51) Int. Cl.
*H04N 1/44* (2006.01)
*G06T 3/00* (2006.01)
*G06T 7/00* (2017.01)
*G06K 9/00* (2006.01)
*G06T 11/60* (2006.01)

(52) U.S. Cl.
CPC ....... *H04N 1/4446* (2013.01); *G06K 9/00624* (2013.01); *G06T 3/0093* (2013.01); *G06T 7/0002* (2013.01); *G06T 11/60* (2013.01); *G06T 2207/30168* (2013.01)

(58) Field of Classification Search
CPC ..... H04N 1/4446; G06T 11/60; G06T 3/0093; G06T 7/0002; G06K 9/00624
USPC ........................................................ 382/156
See application file for complete search history.

(56) References Cited

U.S. PATENT DOCUMENTS

| | | | |
|---|---|---|---|
| 2015/0254868 A1* | 9/2015 | Srikanth | G06T 7/194 348/47 |
| 2016/0004903 A1* | 1/2016 | Shuster | G06K 9/00 382/118 |
| 2019/0019261 A1* | 1/2019 | Lammert, Jr. | G06Q 50/16 |

* cited by examiner

*Primary Examiner* — Ayodeji O Ayotunde
(74) *Attorney, Agent, or Firm* — Ditthavong & Steiner, P.C.

(57) ABSTRACT

A method comprising: analysing an image to determine an image scene category; and generating an anonymized image based on a determined image scene category by applying a morphing model to the image as a whole, such that the anonymised image is between the image and a generic image associated with the identified scene category.

20 Claims, 8 Drawing Sheets

APPARATUS AND METHODS FOR DETERMINING AND PROVIDING ANONYMIZED CONTENT WITHIN IMAGES

CROSS-REFERENCE TO RELATED APPLICATION

This application claims priority from a European Patent Application Serial No. 17196507.2, entitled "Apparatus and Methods For Determining and Providing Anonymized Content Within Images," filed Oct. 16, 2017, the contents of which are hereby incorporated herein in their entirety by this reference.

FIELD OF INVENTION

The present application relates to apparatus and methods for determining and providing anonymized content within images, such as anonymized private space images.

BACKGROUND

In social-networking, sharing of images is one of the most important aspects. However, selective sharing, carefully deciding what to conceal and what to disclose, takes an extraordinary amount of work. Companies are expected to alleviate that work by providing effective tools for users to maximize control over privacy. For visual content, these tools include ways of anonymizing images.

Online image sharing is a daily habit. When sharing their photos, users provide (often unknowingly) information regarding themselves and their location, thus exposing their potentially sensitive information to companies and individuals who might leverage it for purposes that might be undesirable for the data owner or for any person whose identity can be linked to the image itself by analysing its content.

To mitigate this problem, computer scientists have designed technologies that are able to automatically conceal specific elements of a picture. The solutions that are most commonly adopted manipulate images to either conceal the identity of the subjects depicted via face anonymization or mask any clearly identifiable object or marker that can be linked to a specific identity (e.g., a car license plate or a tattoo). In both cases, these technologies work by (1) manually establishing an a-priori list of objects that are considered sensitive, (2) detecting the areas in the image where the sensitive objects are depicted and (3) making them unidentifiable, through blurring or other techniques.

For example Google street view anonymizes images which contain faces or vehicle registration plates by blurring them.

SUMMARY

In a first aspect there is provided: an apparatus comprising at least one processor, and at least one memory including computer program code, wherein the at least one memory and the computer program code are configured, with the at least one processor, to: analyse an image to determine an image scene category; and generate an anonymized image based on a determined image scene category by an application of a morphing model to the image as a whole, such that the anonymised image is between the image and a generic image associated with the identified scene category.

The at least one processor may be further configured to select the morphing model based on the determined image scene category.

The processor configured to analyse an image to determine an image scene category may be configured to apply a scene detector to determine the image scene category.

The scene detector may be a deep neural network for scene classification of an image. The morphing model may be a deep generator for activation maximization.

The processor configured to generate an anonymized image based on an application of the morphing model to the image as a whole may be further configured to generate the anonymized image further based on an anonymization parameter.

The anonymization parameter may be configured such that: a first value of the anonymization parameter causes the selected morphing model to generate an anonymized image equal to the image; and a second value of the anonymization parameter causes the selected morphing model to generate an anonymized image equal to the generic image associated with the identified image scene category.

The first value of the anonymization parameter may be a minimum value and the second value of the anonymization parameter may be a maximum value.

The first value of the anonymization parameter may be a maximum value and the second value of the anonymization parameter may be a minimum value.

The first value of the anonymization parameter may be 0 and the second value of the anonymization parameter may be 1.

The first value of the anonymization parameter may be −1 and the second value of the anonymization parameter may be 1.

The processor may be further configured to determine the anonymization parameter.

The processor configured to determine the anonymization parameter may be configured to perform at least one of: determine an anonymization parameter value from a user input; determine an anonymization parameter value by determining an application associated with the image.

The apparatus may be further configured to evaluate the anonymized image relative to the image to determine the quality of the anonymized image.

The processor configured to evaluate the anonymized image relative to the image to determine the quality of the anonymized image may be configured to evaluate at least one of: an extent of a preservation of the determined image scene category in the anonymized image; an extent of a preservation of a sentiment associated with the image in the anonymized image;

and an extent of a recognition of an owner of the image with the anonymized image.

The processor configured to evaluate the extent of a preservation of the determined image scene category in the anonymized image may be configured to apply a scene detector to the anonymized image to determine an anonymized image scene category.

The scene detector applied to the anonymized image may be the scene detector applied to the image.

The processor configured to evaluate the extent of a preservation of a sentiment associated with the image in the anonymized image may be configured to: apply a sentiment detector deep neural network to determine an anonymized image sentiment value and an image sentiment value; and compare the anonymized image sentiment value and the image sentiment value to determine whether the sentiment associated with the image in the anonymized image is preserved.

The processor configured to evaluate the extent of a recognition of an owner of the image with the anonymized image may be configured to: apply a trained ownership detector classifier to the image to generate an ownership identifier; apply the trained ownership detector classifier to the anonymized image to generate a further ownership identifier; and compare the further ownership identifier with the ownership identifier to determine the extent of a recognition of an owner of the image with the anonymized image.

According to a second aspect there is provided a method comprising: analysing an image to determine an image scene category; and generating an anonymized image based on a determined image scene category by applying a morphing model to the image as a whole, such that the anonymised image is between the image and a generic image associated with the identified scene category.

The method may further comprise selecting the morphing model based on the determined image scene category.

Determining an image scene category may comprise applying a scene detector to determine the image scene category.

The scene detector may be a deep neural network for scene classification of an image.

The morphing model may be a deep generator for activation maximization.

Generating an anonymized image based on an application of the morphing model to the image as a whole may further comprise generating the anonymized image further based on an anonymization parameter.

The anonymization parameter is configured such that: a first value of the anonymization parameter causes the selected morphing model to generate an anonymized image equal to the image; and a second value of the anonymization parameter causes the selected morphing model to generate an anonymized image equal to the generic image associated with the identified image scene category.

The first value of the anonymization parameter may be a minimum value and the second value of the anonymization parameter may be a maximum value.

The first value of the anonymization parameter may be a maximum value and the second value of the anonymization parameter may be a minimum value.

The first value of the anonymization parameter may be 0 and the second value of the anonymization parameter may be 1.

The first value of the anonymization parameter may be −1 and the second value of the anonymization parameter may be 1.

The method may further comprise determining the anonymization parameter.

Determining the anonymization parameter may comprise at least one of: determining an anonymization parameter value from a user input; and determining an anonymization parameter value by determining an application associated with the image.

The method may further comprise evaluating the anonymized image relative to the image to determine the quality of the anonymized image.

Evaluating the anonymized image relative to the image to determine the quality of the anonymized image may comprise evaluating at least one of: an extent of a preservation of the determined image scene category in the anonymized image; an extent of a preservation of a sentiment associated with the image in the anonymized image; and an extent of a recognition of an owner of the image with the anonymized image.

Evaluating the extent of a preservation of the determined image scene category in the anonymized image may comprise applying a scene detector to the anonymized image to determine an anonymized image scene category.

The scene detector applied to the anonymized image may be the scene detector applied to the image.

Evaluating the extent of a preservation of a sentiment associated with the image in the anonymized image may comprise: applying a sentiment detector deep neural network to determine an anonymized image sentiment value and an image sentiment value; and comparing the anonymized image sentiment value and the image sentiment value to determine whether the sentiment associated with the image in the anonymized image is preserved.

Evaluating the extent of a recognition of an owner of the image with the anonymized image may comprise: applying a trained ownership detector classifier to the image to generate an ownership identifier; applying the trained ownership detector classifier to the anonymized image to generate a further ownership identifier; comparing the further ownership identifier with the ownership identifier to determine the extent of a recognition of an owner of the image with the anonymized image.

According to a third aspect there is provided a computer program comprising program code means adapted to perform the steps of the second aspect when the program is run on a data processing apparatus.

According to a fourth aspect there is provided a computer storage medium configured to store the steps of the second aspect suitable for being performed by at least one processor.

BRIEF DESCRIPTION OF DRAWINGS

To assist understanding of the present disclosure and to show how embodiments may be put into effect, reference is made by way of example to the accompanying drawings in which.

DETAILED DESCRIPTION

The examples disclosed in this application are applicable to apparatus, methods and computer storage medium suitable for storing such methods for analysing images in order to identify features within an image for anonymizing, wherein anonymizing is configured to generate generic features to replace the identified features. Furthermore the apparatus, methods and computer programs are configured to identify other features and/or conditions shown within the image which are to be preserved accurately.

The concept thus as described in further detail hereafter is one in which the method or apparatus is configured to anonymize images of private spaces (indoor personal spaces such as bedroom, living room) and to automatically evaluate the quality of the anonymization. After anonymization, the identity owner of the private space depicted in the image cannot be recognized. At the same time, some basic characteristics of the private space (e.g. sentiment, ambiance) are preserved after anonymization.

Methods for image anonymization should specify the subject of the anonymization and method used for anonymization. With respect to the subject of anonymization the identity of a user in an image can be disclosed through 3 different cues:

i) Biometric cues: personal physiological characteristics which are unique to each person (e.g. fingerprint)

ii) Soft biometric cues: non-distinctive physical characteristics such as tattoos or eye colours iii) Non-biometric cues: contextual identifiers such as text on image, license plate, private environment.

Existing methods have focused on image de-identification of biometric and soft-biometrics cues (e.g. face anonymization). A small set of technologies have also been developed to anonymize a specific type of non-biometric cues, namely license plates. Although, images of personal environment can disclose very private information about the user identity and location, no technique has been explicitly conceived to address this issue. As such in the concepts discussed in further detail hereafter techniques based on computer vision to process and anonymize images of private spaces are disclosed.

With respect to methods for anonymization, the goal of an anonymization technique is to de-identify the image of a private space, namely to manipulate the image with the goal of removing identifying information in a way that both protects the privacy of the person who owns the space (data security) while preserving informative attributes of the image (data utility). The image manipulation should modify the image enough to mask the identity of owner. However, the change introduced should not be too disruptive, otherwise the original meaning of the image will be lost. As such the concept as discussed in the embodiments in further detail hereafter disclose techniques for private space anonymization which modify the whole image in order to remove details which make it distinguishable from others of the same class.

Figure 1:
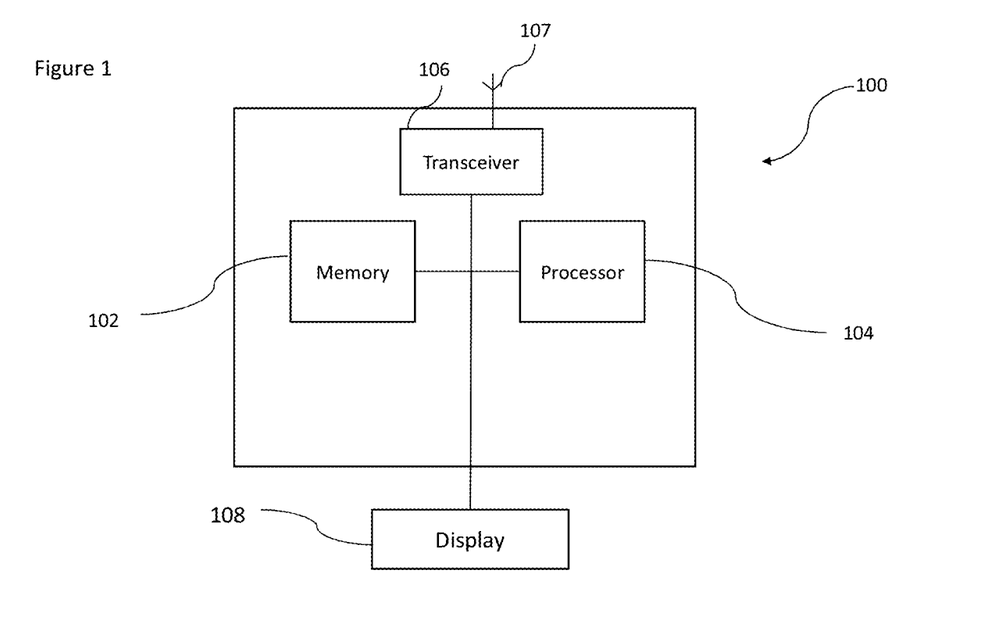
FIG. 1 schematically shows an apparatus suitable for implementing some embodiments.

With respect to FIG. 1, an example of an apparatus 100 or system suitable for implementing some embodiments is shown. The system may be based on computer vision that encourages the use of private space images (e.g. photos of bedroom, living rooms) by securely anonymizing them, allowing people to share the images of their personal spaces, without revealing their identities to algorithms and illicit users. In such a system original images of private spaces are manipulated, and a synthetic version of the original scene is generated. This manipulation masks the identity of the owner of the private space (and ensures data security) while preserving some original traits of the space, such as scene category, sentiment, and ambiance (preserves data utility). The user of the system in some embodiments can verify the quality of the anonymization performed through an evaluation model which calculates data security and data utility of the anonymized images.

The system, for example, as shown in FIG. 1 moreover, unlike traditional image anonymization systems which identify objects to be obfuscated and then remove/blend/blur them, modifies the image as a whole, by morphing the entire scene layout using tools for deep neural network visualisations. When morphing, the method removes all details that make a private space distinguishable from others of the same class, and outputs a "generalised" version of the input private space.

The apparatus 100 comprises a memory 102 and a processor 104. The apparatus 100 also comprises a transceiver/receiver at 106 for receiving information such as image information from other apparatus or devices. The apparatus 100 transceiver 106 may enable the apparatus 100 to also transmit information e.g. image information to other devices and/or to a remote display. The transceiver 106 may be configured to use any suitable protocol and coding system for the transmitting and/or receiving of information. Furthermore although the transceiver 106 is shown connected to a wireless antenna 107 for communicating wirelessly with further apparatus or devices in some embodiments the transceiver 106 is configured to communicate with the further apparatus or devices at least partially by wired connections.

In some embodiments the apparatus 100 also comprises, or is in communication with, a display 108 which enables the apparatus 100 to provide output in a visual fashion such that it can be interpreted by a viewer. For example the apparatus 100 may cause visual information to be provided on the display 108 which can be viewed by the user. In some embodiments the apparatus may furthermore comprise an image source such as a camera or imaging apparatus suitable for generating the image information to be processed.

In some examples, the apparatus 100 and the processor 104 and memory 102 may be configured to execute code or programs in order to enable the functions and models described hereafter to operate.

Although in the example above the apparatus 100 is shown as a single device and thus operates as a single or centralised apparatus in some embodiments the functionality described hereafter may be enabled by a distributed system of apparatus communicating between each other. For example the functionality may be enabled in a cloud based system wherein apparatus or servers are physically or logically separated from each other.

In some embodiments the processor 104 is configured to implement a deep neural network implementations and other functions as discussed in further detail hereafter.

In the following examples the concept is explained with respect to specific example of identifying within image information a room or scene. However it is understood that the same processes as described hereafter may be applied more generally to image data which comprises content to be anonymized by replacement with generic content. Furthermore in some embodiments the content to be anonymized may comprise or may be associated with content, features or conditions within the image which are not to be processed or anonymized in such a manner in order to maintain its specific information content.

Figure 2:
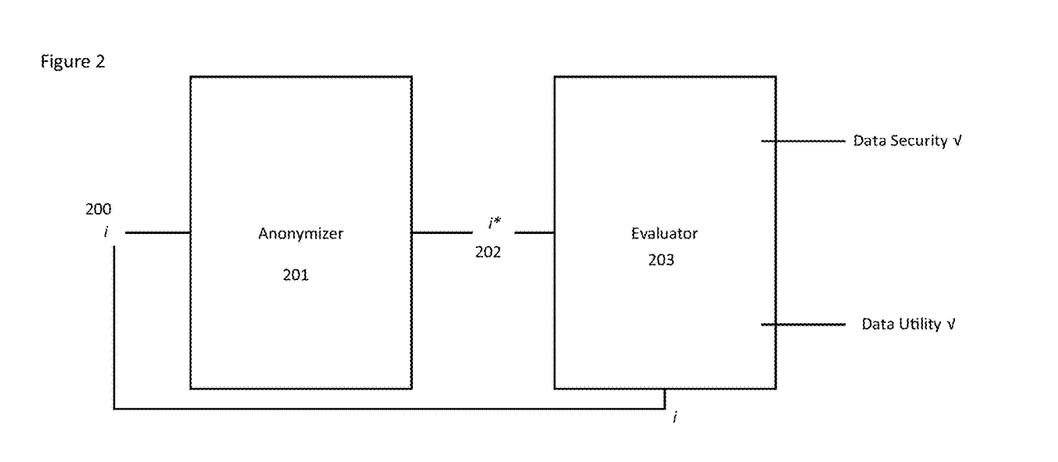
FIG. 2 schematically shows anonymizer and evaluator components of an example system according to some embodiments.

FIG. 2 shows schematically the example components implemented in the system shown in FIG. 1. The system in some embodiments comprises an anonymizer 201 or anonymization module which is configured to receive an image i 200 as an input and produce an anonymized i* 202 version of the image 1200. The anonymizer 201 in the embodiments as described hereafter instead of detecting objects and then blurring them, as current anonymization technologies do, takes each image and "morphs" it as a whole, without the need of identifying the privacy-sensitive parts in the scene. The system furthermore comprises an evaluator 203 or evaluation module which is configured to receive the image i 200 and the anonymized image i* 202 and is configured to evaluate the quality of the anonymization (which may be performed in terms of data security and data utility evaluations).

Figure 3:
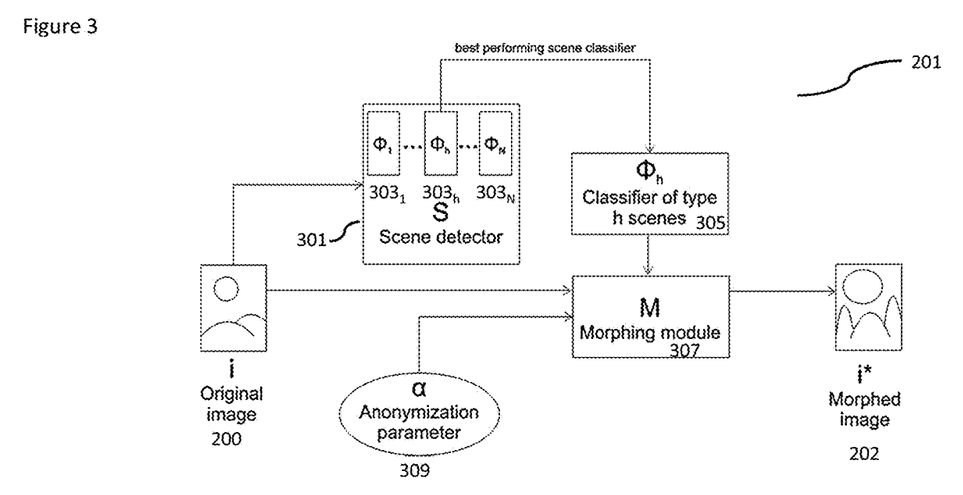
FIG. 3 schematically shows an example anonymizer as shown in FIG. 2 in further detail according to some embodiments.

FIG. 3 shows in further detail the anonymizer 201 according to some embodiments. As discussed previously the anonymizer 201 is configured to take each input image and "morphs" it as a whole, without the need of identifying the privacy-sensitive parts in the scene as performed in current technologies.

The anonymizer 201 receives as an input the original image i 200.

The anonymizer 201 may comprises a scene detector 301. The original image i 200 is first processed by the scene detector S 301. The scene detector 301 is configured to identify or classify the scene depicted in the image. For example where the images are architectural in nature the scene detector may be configured to identify whether the image is one of a garden, kitchen, bedroom etc. The scene detector 301 is implemented in some embodiments by a deep neural network $\phi$ scene classification. The deep neural network is shown in FIG. 3 comprising by the network scene output layer neurons $\phi_1$ 303$_1$, $\phi_h$ 303$_h$, $\phi_n$ 303$_n$. The network therefore processes the original image i 200 and activates the output neurons according to the probability of the image to represent the scene category specific to each neuron. The scene category corresponding to the neuron with the highest activation is selected. The output of the scene detector 301 may be passed to a classifier 305.

In some embodiments the anonymizer 201 may comprise a classifier 305. The classifier 305 may be configured to receive the output neurons from the deep neural network scene detector 301 and be configured to give an output of the scene category h and the respective classifier $\phi\_h$. These outputs may be passed to the morphing module 307.

In some embodiments the scene detector and classifier may be implemented by AlexNet trained on the MIT Places dataset. More information on the MIT places dataset can be found from B. Zhou, A. Lapedriza, J. Xiao, A. Torralba, and A. Oliva. Learning Deep Features for Scene Recognition Using Places Database. In Advances in Neural Information Processing Systems (NIPS) 2014. In using such implementations in some embodiments it is possible to recognize 205 scene categories. This specialized training set is used to focus on the classification of spaces rather than of objects. Thus in some embodiments where the image is of an object, these objects may themselves be classifies and anonymized as a whole also rather than the selection of parts of the object.

In some embodiments the anonymizer 201 may comprise an anonymization parameter $\alpha$ input 309. The anonymization parameter $\alpha$ input 309 may be provided or determined by any suitable manner. For example the anonymization parameter $\alpha$ input 309 may be provided by a user input configured to control the degree of anonymization of the images. In some embodiments the anonymization parameter is determined based on the application associated with the image and/or the determined category of the image. Thus for example where the anonymization operation is associated with a social media application (the user is uploading an image to a social media platform) then the anonymization parameter value is high whereas where the anonymization operation is associated with an email or direct file sharing application (the user is sharing the image via email) then the anonymization parameter is low. Similarly where the image is of a potentially sensitive location, for example a bedroom, the anonymization parameter value associated with the image category of 'bedroom' is a high level and the image is significantly anonymized. Whereas where the image is not potentially sensitive location, for example a shed or garage, then the anonymization parameter associated with the image category of 'shed' is a low level and the image is not as significantly anonymised. In some embodiments the anonymization parameter $\alpha$ input 309 may be controlled or provided as part of a feedback loop with respect to the evaluation process from the evaluator 203. The anonymization parameter $\alpha$ input 309 may thus be value such as first value of the anonymization parameter causes the selected morphing model to generate an anonymized image equal to the image and a second value of the anonymization parameter causes the selected morphing model to generate an anonymized image equal to the generic image associated with the identified image scene category.

In some embodiments the first value of the anonymization parameter may be a minimum value on a range of values and the second value of the anonymization parameter may be a maximum value on a range of values. In other words a 'smaller' or 'more negative' value generates an output image closer to the input image and a 'larger' or 'more positive' value generates an output image closer to the generic image associated with the identified image category.

Thus for example where the range of values is 0 to 1 and thus the first value of the anonymization parameter may be 0 and the second value of the anonymization parameter may be 1. However any suitable range may be used, for example [−1,1], [0,100], [0,11].

In some embodiments the first value of the anonymization parameter may be a maximum value on a range of values and the second value of the anonymization parameter may be a minimum value on a range of values. In other words a 'larger' or 'more positive' value generates an output image closer to the input image and a 'smaller' or 'more negative' value generates an output image closer to the generic image associated with the identified image category.

In some embodiments the input anonymization parameter is a defined as a first range of values and is then normalised between 0 and 1 and applied to the morphing model or may be directly selected from a range of values between 0 and 1. In some embodiments the normalisation of the anonymization parameter $\alpha$ may be performed in the morphing module 307 during the morphing process. The anonymization parameter $\alpha$ input 309 is configured to be input to the morphing module 307.

In some embodiments the anonymizer 201 may comprise a morphing module 307. The morphing module 307 may be configured to receive the original image i 200, the anonymization parameter 309, the scene category h and the respective classifier $\phi\_h$.

The morphing module 307 may be a scene-specific morphing module M selected by from pool of pre-trained models. The morphing module 307 receives the image i 200 and the anonymization parameter $\alpha \in [0,1]$ used to select the desired anonymization level that needs to be applied to the picture. The morphing module 307 is then configured to process the input original image i 200 and output an anonymized picture i* 202 which is a "generalized" version of i. In other words, the image i 200 is modified in a way that all details that make image i distinguishable from other images of category h are removed. In some embodiments the morphing module 307 is implemented with a deep generator for activation maximization (DG-AM). Given an input image i, the DG-AM iteratively re-calculates the colour of is pixels in a way such that the output image i* both maximizes the activation of neuron h and looks photo realistic. In some embodiments this is performed by conditioning the maximization to an image prior. This is equivalent to finding the feature vector f that maximizes the following expression:

$$i^* = G(f)|\mathrm{argmax}(\phi_h(G(f)) - \lambda\|f\|)$$

Where G(f) is the image synthetically generated from the candidate feature vector f; $\phi_h(G(f))$ is the activation value of neuron h in the scene classifier $\phi_h$ (the value to be maximized), and $\lambda$ is a $L_2$ regularization term.

The initialization of f is of significance to the anonymization process. If f were to be initialized with random noise, then the resulting G(f) would be the average representation of category h (of, e.g., a garden). Instead, since f is initialized with i, then the resulting G(f) is i's morphed version. That is, the details that make i distinguishable from other images of category h are removed (e.g., the details that make i distinguishable from images of gardens are removed). Overall, the result of the iterations is the image G(f) whose look is close to the average representation of category h.

In some embodiments the function G is provided by Yosinski et al.'s synthetic image generator which is explained in further detail within "Understanding Neural Networks through Deep Visualization", ArXiv Preprint arXiv:1506.06579, 2015. Furthermore the synthetic image generator may be trained on ImageNet, further details of which may be found from A. Krizhevsky, I. Sutskever, and G. E. Hinton. Imagenet Classification with Deep Convolutional Neural Networks. In Advances in Neural Information Processing Systems (NIPS), 2012.

In such embodiments the hyper-parameters may be chosen as 30 iterations, and $\lambda=0.005$. $\alpha$ is used as initial learning rate hyper-parameter to control the extent to which the original image is morphed. A low morphing (e.g., learning rate 0.01) generates the morphed image i* which is still quite similar in terms of colours and structure to the initial picture i. Implementing medium morphing (e.g., learning rate 0.5), the generated morphed image i* has a look in between the average image of category h, and the original image i. A high morphing (e.g., learning rate close to 1), produces a morphed image i* similar to the average image of category h.

Figure 4:
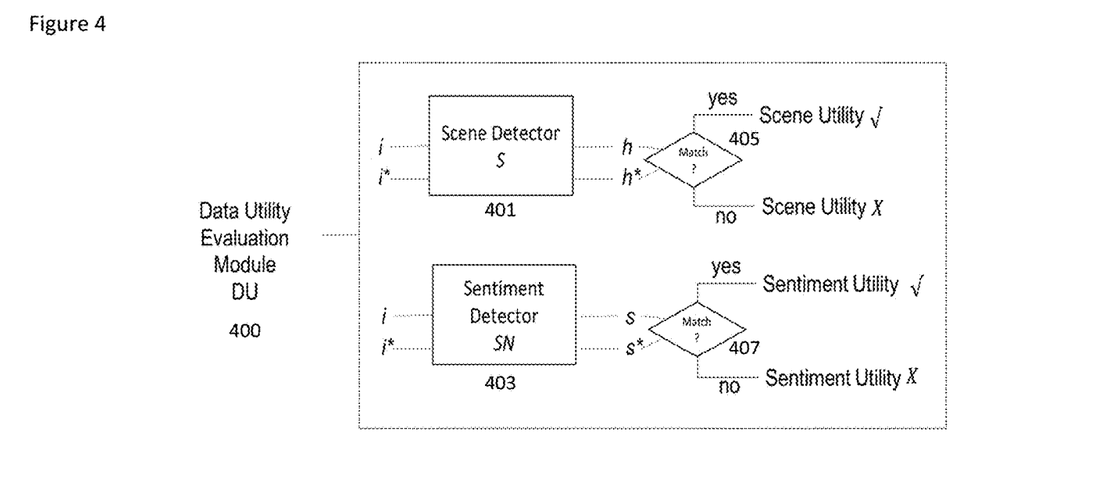
FIG. 4 schematically shows an example utility evaluation module as implemented within the evaluator shown in FIG. 2 according to some embodiments.
Figure 5:
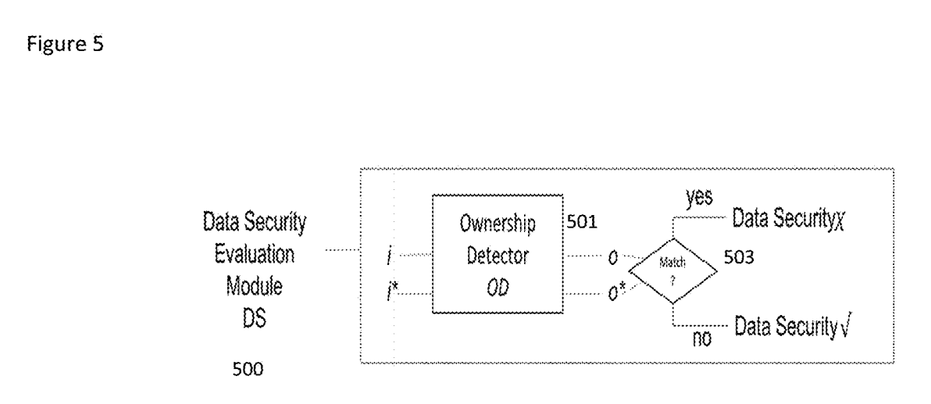
FIG. 5 schematically shows an example security evaluation module as implemented within the evaluator shown in FIG. 2 according to some embodiments.

With respect to FIGS. 4 and 5 examples of data utility evaluation module and data security evaluation module as implemented within the evaluator 203 are shown. As discussed earlier the evaluator 203 is configured to provide an assessment of the quality of the anonymization in terms of data utility and data security. The evaluator takes as input the original image i and the anonymized image i*, and may comprise a data utility evaluator configured to evaluate the extent to which the meaning of the original image is preserved after anonymization and a security evaluator configured to evaluate the extent to which the original image cannot be recognized after anonymization.

FIG. 4 shows an example of a data utility evaluation module 400.

In some embodiments the data utility evaluation module 400 comprises a scene detector 401 (scene utility evaluator) configured to test verify that the semantic category of the scene (e.g., bedroom, living room) is preserved after anonymization. The scene detector 401 in some embodiments is implemented by the scene detector module S (such as implemented within the anonymizer 201) and is configured to receive the anonymized image i* and output a scene categorization category h* of the anonymized image. The anonymized image i* scene category h* may be passed to a comparator 405. In some embodiments the original image i is further passed through the scene detector 401 to reproduce the original image i scene category h which is also passed to the comparator 405. In some implementations the original image scene category h is stored and therefore the stored original image scene category h is retrieved and passed to the comparator 405 (and thus the scene detector 401 only processes the anonymized image i*). The data utility evaluation module may comprise a utility comparator 405. The utility comparator 405 may be configured to receive the original image scene category h and anonymized image scene category h* and compare them to determine whether there is a match. The output of the utility comparator 405 may be used to determine the final evaluation of the anonymization.

In some embodiments the data utility evaluation module 400 comprises a sentiment detector SN 403. The sentiment detector 403 is configured to receive the original image i and the anonymized image i* and verify that the sentiment aroused by the original image is preserved after anonymization. In some embodiments the sentiment detector is a deep neural network $\phi$ for sentiment classification. An example of a suitable implementation can be found from Campos, Victor, Brendan Jou, and Xavier Giro-i-Nieto. "From pixels to sentiment: Fine-tuning cnns for visual sentiment prediction." Image and Vision Computing (2017). The output of the sentiment detector is a value s with respect to the original image i and value s* with respect to the anonymized image i* which may be output to a sentiment comparator 407. The values s and s* reflecting how positive the sentiment of the image is. The data utility evaluation module may further comprise a sentiment comparator 407. The sentiment comparator 407 may be configured to receive the original image sentiment value s and anonymized image sentiment value s* and compare them to determine the distance between them. In some embodiments the distance is compared against a threshold value to determine whether the sentiment is maintained between the original and anonymized images.

FIG. 5 shows an example of a security evaluation module or evaluator 500. The security evaluation evaluator 500 may in some embodiments comprise an ownership detector OD 501. The ownership detector 501 is configured to receive the original image i and the anonymized image i* attempt to recognize the owner of the image of a private space. In the learning phase, the OD 501 classifier is trained with images of private spaces (e.g., bedroom) coming from different owners: each image is labelled with an owner ID, and multiple images per owner ID are contained in the training set. The classifier learns, given image features, how to automatically detect the owner ID o of a private space image. The aim of the anonymization technique is to defeat this classifier. Therefore, the data security test is positive if the owner id o* assigned by the ownership classifier to the anonymized image i* does not match the original owner id o of the unmodified image i. Thus the ownership detector in some embodiments is configured to output an ownership ID o with respect to the original image i and ownership ID o with respect to the anonymized image i* which may be output to a security comparator 503. The data security evaluation module 500 may further comprise a security comparator 503. The security comparator 503 may be configured to receive the original image ownership ID o and anonymized image ownership ID o* and compare them to determine the distance between them and thus whether the anonymization process has removed the association between anonymized image and the original image owner. In other words the data security test is positive if the owner id o* assigned by the ownership classifier to the anonymized image i* does not match the original owner id o of the unmodified image i.

Figure 6:
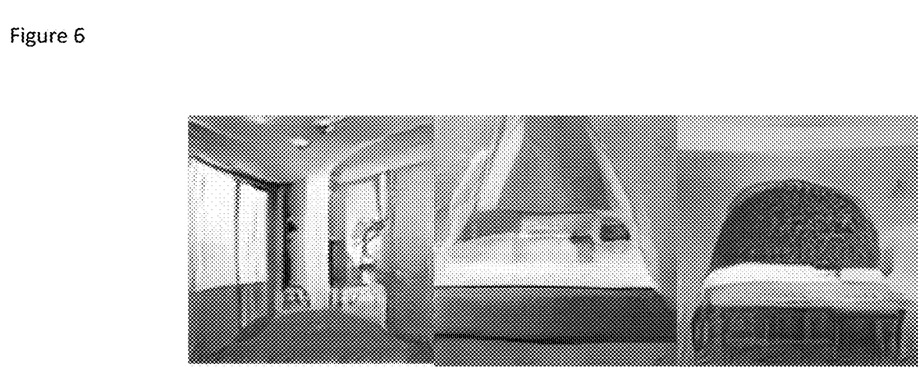
FIG. 6 shows example images anonymized by the example anonymizer.

With respect to FIG. 6 are shown three examples of bedroom images anonymized with our technology which all share the same visual style. An image anonymized through the methods described herein would be easily recognizable at a glance by any non-expert. Objects in the anonymized images thus appear slightly distorted and are depicted with a characteristic stylistic signature characterized by smoother angles and faded colours and shades such as shown in FIG. 6.

Figure 7:
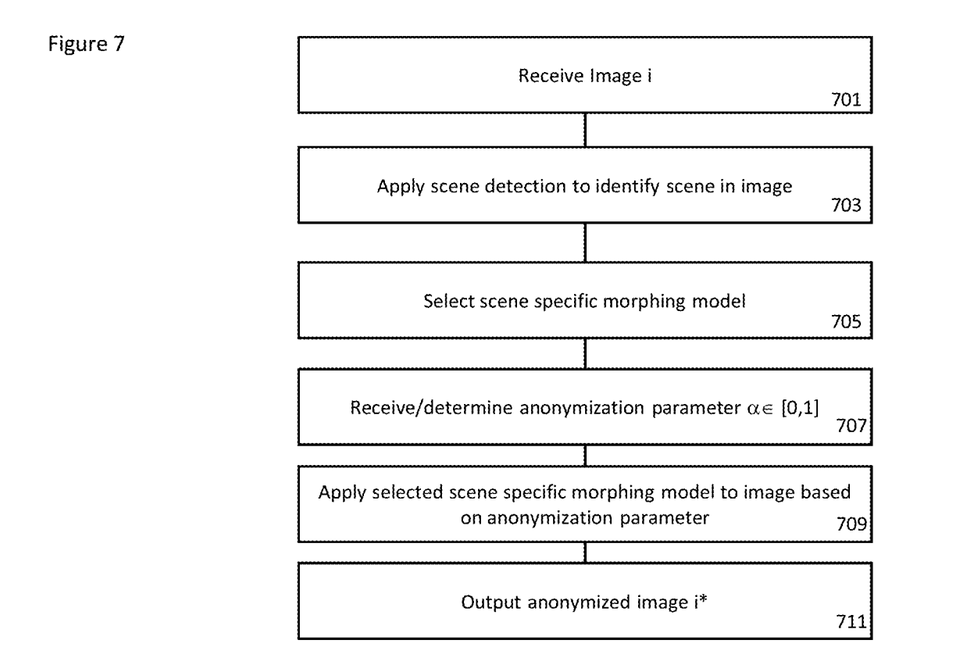
FIG. 7 shows a flow chart showing the operations of the example anonymizer according to some embodiments.

With respect to FIG. 7 is shown an example flow diagram summarising the operation of the example anonymizer 201 shown in FIG. 2.

In some embodiments the original image is received.

The operation of receiving the original image is shown in FIG. 7 by step 701.

The scene detector may then be applied to the received image in order to identify and classify the scene.

The operation of applying a scene detection to identify the scene in the image is shown in FIG. 7 by step 703.

The scene specific morphing model may then be selected based on the identified scene.

The operation of selecting the scene specific morphing model is shown in FIG. 7 by step 705.

Furthermore the anonymization parameter is determined and/or received.

The operation of receiving and/or determining the anonymization parameter is shown in FIG. 7 by step 707.

The selected scene specific morphing model is then applied to the image based on the anonymization parameter to generate an anonymized image.

The application of the scene specific morphing model to the image based on the anonymization parameter to generate an anonymized image is shown in FIG. 7 by step 709.

The anonymized image i* may then be output, for example to the evaluation module to be evaluated.

The operation of outputting the anonymized image i* is shown in FIG. 7 by step 711.

Figure 8:
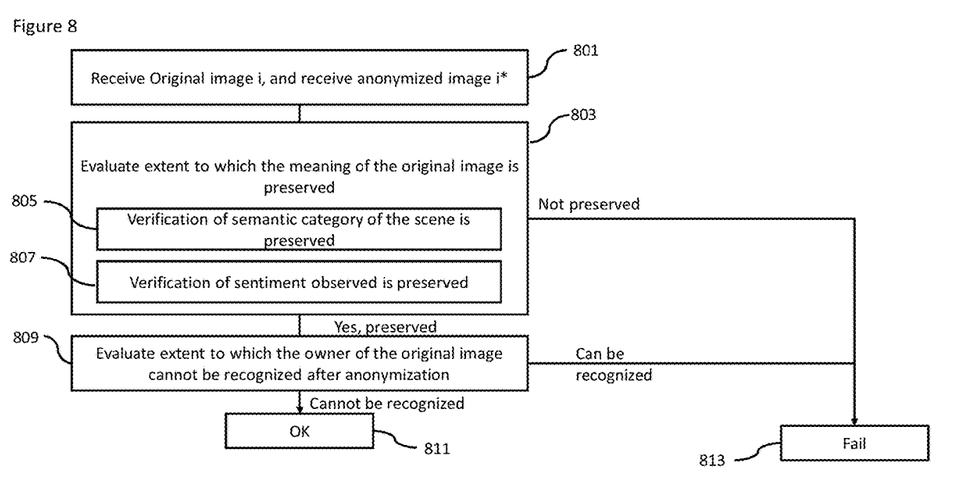
FIG. 8 shows a flow chart showing the operations of the example evaluator according to some embodiments.

With respect to FIG. 8 is shown an example flow diagram summarising the operation of the example evaluator 203 shown in FIG. 2.

In some embodiments the original image i and the anonymized image i* are received.

The operation of receiving the original image i and the anonymized image i* is shown in FIG. 8 by step 801.

The evaluation may then perform an evaluation operation to determine the extent to which the meaning of the original image is preserved in the anonymized image.

The operation of evaluating the extent to which the meaning of the original image is preserved in the anonymized image is shown in FIG. 8 by step 803.

This operation may in turn be divided into two further evaluations. Firstly a verification of the preservation of the semantic category of the scene within the images. The verification of the semantic category preservation of the images is shown in FIG. 8 by (sub)step 805. Secondly a verification of the preservation of the sentiment observed within the images. The verification of the observed sentiment preservation of the images is shown in FIG. 8 by (sub)step 807.

Where the meaning of the original image within the anonymized image is not preserved then the anonymization operation may pass to a fail state. In other words there is a lack of match in the output from the scene detector when the input is the original image and the anonymized image or the sentiment value output based on the original image and the anonymized image differs significantly (and is above a determined threshold value).

The fail state is represented in FIG. 8 by step 813 and may reflect an operation wherein the anonymization models are checked or further training applied to the models and the original image input to a the newly trained or checked models.

Where the meaning of the original image within the anonymized image is preserved (the scene detector output is the same and the sentiment is similar) then there may be an evaluation of the extent to which the owner of the original image cannot be recognized after anonymization.

The operation of evaluating the extent to which the owner of the original image cannot be recognized after anonymization is shown in FIG. 8 by step 809.

Where the evaluation determines that the original image owner can be recognized from the anonymized image (the owner ID is the same for both the original image and the anonymized image) then the anonymization operation may pass to the fail state.

Where the evaluation determines that the original image owner cannot be recognized from the anonymized image (the owner ID is different for the original image and the anonymized image) then the anonymization operation may pass to the OK state.

The OK state is represented in FIG. 8 by step 811 and may be one outputs an evaluation of the anonymization to indicate that the anonymization is acceptable.

Implementations using such embodiments thus allow anonymizing images in a way that provides consistent output that is virtually indistinguishable from real data. The output can be stored in databases and even used for further machine learning systems without compromising the identity of the person. Furthermore by morphing a whole image has a technical benefit of improved processing efficiency because there is no need to recognize individual objects in the image before attempting to anonymise these identified individual objects in a manner performed in the known art.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more embodiments with any of the other embodiments previously discussed.

The invention claimed is:

1. A method comprising:
analyzing an image to determine an image scene category relating to a private space; and
generating an anonymized image based on the determined image scene category by applying a morphing model to the image as a whole, such that the anonymized image is between the image and a generic image associated with the determined image scene category.

2. The method as claimed in claim 1, further comprising selecting the morphing model based on the determined image scene category.

3. The method as claimed in claim 1, wherein determining the image scene category comprises applying a scene detector to determine the image scene category.

4. The method as claimed in claim 3, wherein the scene detector is a deep neural network for scene classification of an image.

5. The method as claimed in claim 1, wherein the morphing model is a deep generator for activation maximization.

6. A method comprising:
analyzing an image to determine an image scene category; and
generating an anonymized image based on the determined image scene category by applying a morphing model to the image as a whole, such that the anonymized image is between the image and a generic image associated with the determined image scene category,
wherein generating the anonymized image based on the applying of the morphing model to the image as a whole further comprises generating the anonymized image based on an anonymization parameter, wherein the anonymization parameter is configured such that:
a first value of the anonymization parameter causes the selected morphing model to generate an anonymized image equal to the image; and
a second value of the anonymization parameter causes the selected morphing model to generate an anonymized image equal to the generic image associated with the determined image scene category.

7. The method as claimed in claim 6, further comprising determining the anonymization parameter.

8. The method as claimed in claim 7, wherein determining the anonymization parameter comprises at least one of:
determining the anonymization parameter value from a user input; and
determining the anonymization parameter value by determining an application associated with the image.

9. A method comprising:
analyzing an image to determine an image scene category;
generating an anonymized image based on the determined image scene category by applying a morphing model to the image as a whole, such that the anonymized image is between the image and a generic image associated with the determined image scene category; and
evaluating the anonymized image relative to the image to determine the quality of the anonymized image,
wherein evaluating the anonymized image relative to the image to determine the quality of the anonymized image further comprises evaluating at least one of:
an extent of a preservation of the determined image scene category in the anonymized image;
an extent of a preservation of a sentiment associated with the image in the anonymized image; and
an extent of a recognition of an owner of the image with the anonymized image.

10. The method as claimed in claim 9, wherein evaluating the extent of a preservation of the determined image scene category in the anonymized image further comprises applying a scene detector to the anonymized image to determine an anonymized image scene category.

11. The method as claimed in claim 10 and when dependent on claim 3, wherein the scene detector applied to the anonymized image is the scene detector applied to the image.

12. The method as claimed in claim 9, wherein evaluating the extent of the preservation of the sentiment associated with the image in the anonymized image comprises:
applying a sentiment detector deep neural network to determine an anonymized image sentiment value and an image sentiment value; and
comparing the anonymized image sentiment value and the image sentiment value to determine whether the sentiment associated with the image in the anonymized image is preserved.

13. The method as claimed in claim 9, wherein evaluating the extent of the recognition of the owner of the image with the anonymized image further comprises:
applying a trained ownership detector classifier to the image to generate an ownership identifier;
applying the trained ownership detector classifier to the anonymized image to generate a further ownership identifier; and comparing the further ownership identifier with the ownership identifier to determine the extent of a recognition of an owner of the image with the anonymized image.

14. An apparatus comprising at least one processor, and at least one memory including computer program code, wherein the at least one memory and the computer program code are configured, with the at least one processor, to:
analyze an image to determine an image scene category relating to a private space; and
generate an anonymized image based on a determined image scene category by applying a morphing model to the image as a whole, such that the anonymized image is between the image and a generic image associated with the determined scene category.

15. The apparatus according to claim 14 is further configured to select the morphing model based on the determined image scene category.

16. The apparatus according to claim 14, wherein the determination of the image scene category is further configured to apply a scene detector to determine the image scene category.

17. The apparatus according to claim 16, wherein the scene detector is a deep neural network for scene classification of an image.

18. An apparatus comprising at least one processor, and at least one memory including computer program code, wherein the at least one memory and the computer program code are configured, with the at least one processor, to:
analyze an image to determine an image scene category; and
generate an anonymized image based on a determined image scene category by applying a morphing model to the image as a whole, such that the anonymized image is between the image and a generic image associated with the determined scene category,
wherein the generation of the anonymized image based on the applying of the morphing model to the image as a whole is further configured to generate the anonymized image based on an anonymization parameter, wherein the anonymization parameter is configured such that:
a first value of the anonymization parameter causes the selected morphing model to generate an anonymized image equal to the image; and
a second value of the anonymization parameter causes the selected morphing model to generate an anonymized image equal to the generic image associated with the identified image scene category.

19. The apparatus according to claim 14 is further configured to evaluate the anonymized image relative to the image to determine the quality of the anonymized image.

20. The method as claimed in claim 1, wherein the private space is associated with a user, and the anonymized image is generated to conceal identify of the user.

* * * * *